3,359,426
RELAY CONTROL CIRCUIT
George S. Burr, Wellesley Hills, Mass., assignor to Instron Corporation, Canton, Mass., a corporation of Massachusetts
Filed Nov. 27, 1964, Ser. No. 414,185
7 Claims. (Cl. 307—38)

ABSTRACT OF THE DISCLOSURE

A relay control module comprising a pair of main leads, a momentarily actuable first relay, and a second relay; the first relay including a first switch normally connecting portions of a first of the main leads but actuated by energization of the first relay to complete a circuit through a rung lead and the second relay, and a second switch normally connecting portions of the second of the main leads and actuated by energization of the first relay to open, the first relay second switch being on the side of the rung lead most distant from the portion of the second main lead adapted for connection to ground and the first relay first switch being on the opposite side of the main lead; and the second relay including a first switch normally open but actuated by the second relay to maintain a circuit through the rung lead and the second relay, and a second switch normally open but actuated by energization of the second relay to supply current to a load.

---

This invention relates to a relay control circuit, and more particularly to such a circuit useful as a module to cooperate with other such modules in control of a corresponding plurality of power supply functions.

It is a primary object of the invention to provide a relay control module of circuitry adapted to effectively control supply of power to a load. Other objects are to supply such a module which may be used with other such modules to control power supply to a corresponding plurality of loads, at the same time insuring that power is never supplied to more than one load at a time; to provide simplified circuitry well adapted for programming of a plurality of loads for power supply in a sequential relationship; to make possible easy expansion of such a plurality to add further loads by, in a manner of speech, simply connecting in further modules of the invention as added rungs of a circuit ladder; and in preferred embodiments incorporating a multiplicity of said modules to include a control relay in series with one leg of the ladder and a control switch in series with the other.

Figure 1:
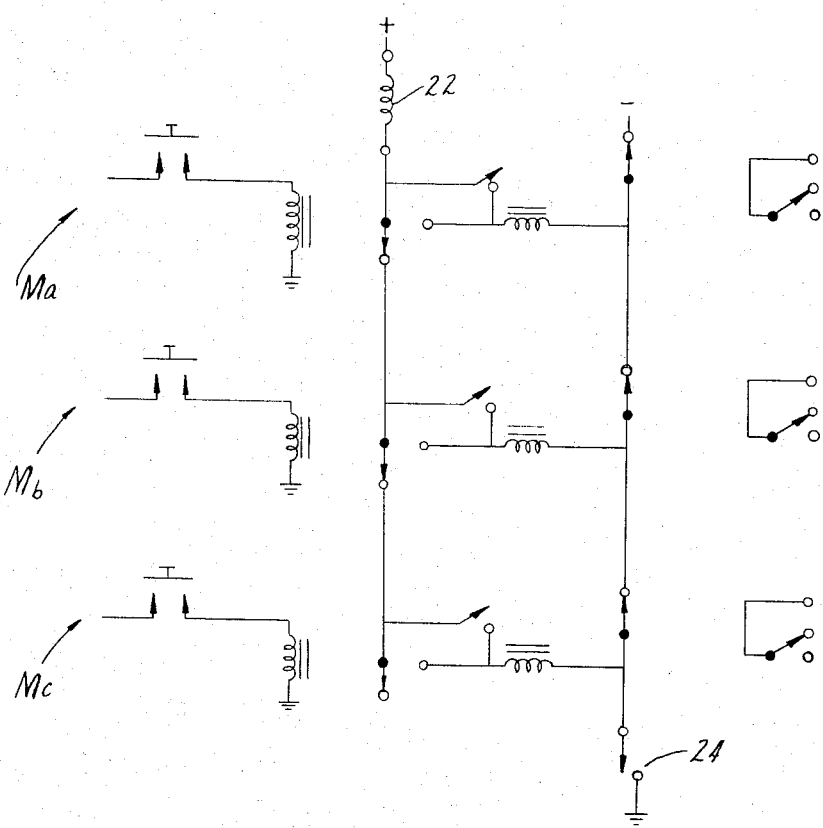
Figure 2:
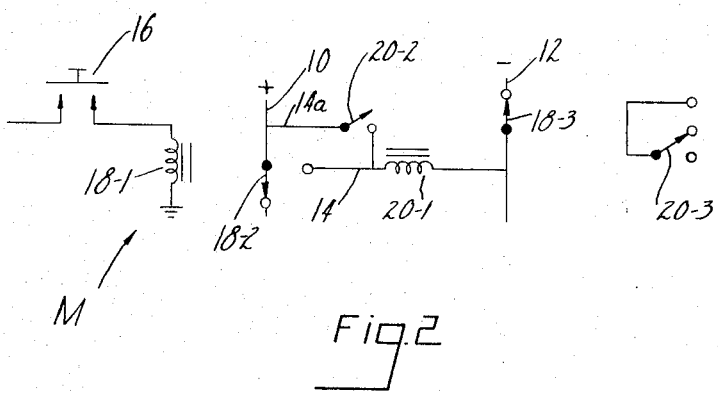

Other objects, advantages, and features will appear from the following description of preferred embodiments of the invention, taken together with the attached drawings thereof, in which:

FIG. 1 is a diagram of a ladder type mutually exclusive relay circuit incorporating three of the modules of the invention; and FIG. 2 is a diagram of a single module of the invention.

Referring now in greater detail to the drawings, there is shown in FIG. 2 the circuit diagram of a module, suitably carried in its own separate physical package, indicated generally at M. This module includes main leads 10 and 12, rung lead 14, biased-open push-button which 16, and two relays 18 and 20 with respectively relay coils 18–1 and 20–1. The relay 18 includes switch 18–2 normally in position to transmit current through the module in main lead 10, but movable upon actuation of relay 18 by push-button 16 to connect main lead 10 with rung lead 14. Relay 18 additionally includes switch 18–3, normally in position to transmit current through the module in main lead 12, but movable upon actuation of relay 18 to open the circuit through lead 12 above the module 10. Relay 20, actuated by current through rung lead 14 upon movement of switch 18–2 to connect main lead 10 and rung lead 14, includes switch 20–2, normally open but closed by actuation of relay 20 to connect rung lead 14 through rung lead 14a with main lead 10, and switch 20–3, normally open but closed upon actuation of relay 20 to complete a power circuit through a load.

In FIG. 1 is shown three of the modules (Ma, Mb, Mc) of the invention, connected with their main leads 10 and 12 respectively in series to form a circuit ladder with three rungs. Also provided are control relay 22, energized upon energization of any of the relays 20, and control switch 24.

In operation, as will appear, pushing any push-button 16 energizes that rung's relay 18 and thereby both energizes relay 20 in the same rung and deenergizes the relay 20 of any rung above (through switch 18–3) or below (through switch 18–2), providing mutual rung exclusivity. Energization of relay 20 provides current through the rung's load (through switch 20–3) indefinitely (since switch 20–2 remains closed until relay 20 is deenergized, whether by pushing another rung's push-button 16 or control switch 24). The relay 22 may for example control a power system brake, deenergizing it upon any relay 20's energization to permit a drive system to operate.

If two push-buttons 16 are simultaneously pushed, no relay 20 is actuated, as will be seen, a further safety feature insuring that at most one load at a time will be supplied with power.

Other embodiments within the claims following will occur to those skilled in the art.

I claim:

1. A relay control module comprising a pair of main leads, a main module switch, a momentarily actuable first relay, and a second relay, said first relay including a first switch normally connecting portions of a first of said main leads but actuated by energization of said first relay to complete a circuit through a rung lead and said second relay, and a second switch normally connecting portions of the second of said main leads and actuated by energization of said first relay to open, said first relay second switch being on the side of said rung lead most distant from the portion of said second main lead adapted for connection to ground and said first relay first switch being on the opposite side of said rung lead, and said second relay including a first switch normally open but actuated by said second relay to maintain a circuit through said rung lead and said second relay and a second switch normally open but actuated by energization of said second relay to supply current to a load.

2. The module of claim 1 in which said main module switch is a biased-open push-button.

3. The module of claim 1 which includes in combination therewith at least one other said module, main leads of each said module being connected in series with corresponding main leads of each other said module.

4. The combination of claim 3 which includes an additional control device in series with one of said main leads.

5. The combination of claim 4 in which said control device is a relay.

6. The combination of claim 4 in which said control device is a switch.

7. The combination of claim 3 which includes two additional control devices in series with one of said main leads, one of said devices being a control relay in series with one of said main leads and the other being a control switch in series with the other of said main leads.

(References on following page)

References Cited

UNITED STATES PATENTS

| | | | |
|---|---|---|---|
| 2,712,101 | 6/1955 | Salati | 317—137 |
| 2,825,050 | 2/1958 | Hausten | 317—154 X |
| 2,971,135 | 2/1961 | Ebert | 317—154 X |
| 2,981,869 | 4/1961 | Balint | 317—137 |
| 3,296,499 | 1/1967 | Quinlan | 317—137 X |

ORIS L. RADER, *Primary Examiner.*

T. B. JOIKE, *Assistant Examiner.*